Nov. 30 1943.  W. A. SANDBERG  2,335,450
AIR LOCK AND MANWAY THEREFOR
Filed June 16, 1942  2 Sheets-Sheet 1

WILLIAM A. SANDBERG
INVENTOR

ATTORNEY

Nov. 30 1943.   W. A. SANDBERG   2,335,450
AIR LOCK AND MANWAY THEREFOR
Filed June 16, 1942   2 Sheets-Sheet 2
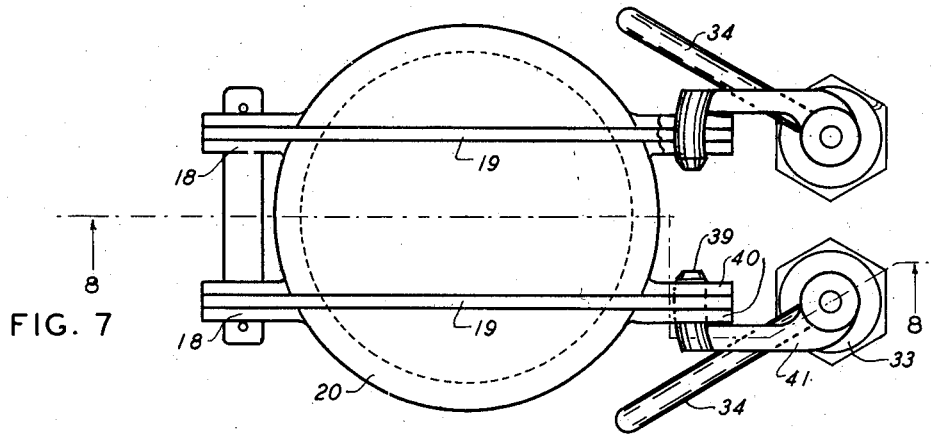
FIG. 7
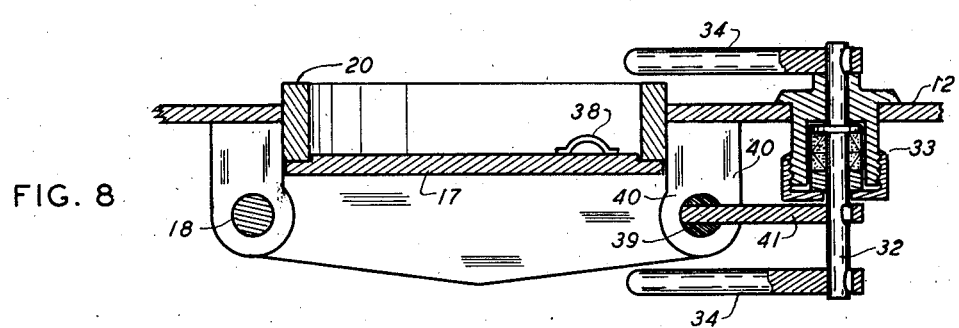
FIG. 8
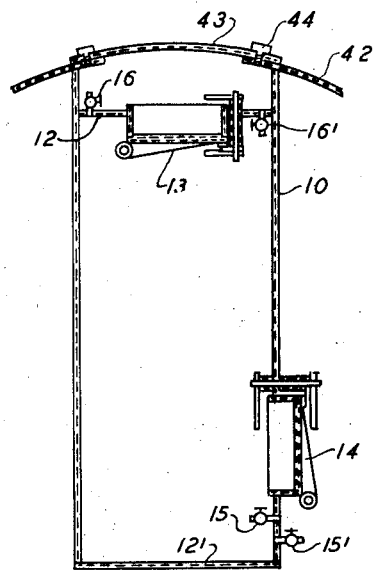
FIG. 9
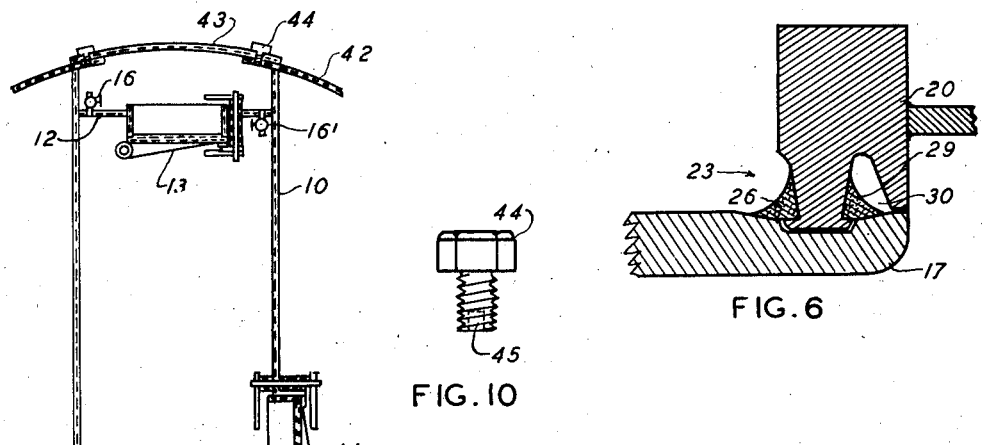
FIG. 10
FIG. 6
WILLIAM A. SANDBERG
INVENTOR
ATTORNEY Patented Nov. 30, 1943

2,335,450

UNITED STATES PATENT OFFICE 2,335,450

AIR LOCK AND MANWAY THEREFOR

William A. Sandberg, Los Angeles, Calif.

Application June 16, 1942, Serial No. 447,310

9 Claims. (Cl. 61—83)

The invention is primarily directed to the provision of manways adapted particularly to airlocks affording access to or egress from submerged vessels, caissons, and other vessels in which the existing pressure may be greater or less than that of the surrounding medium.

An object of the invention is to provide an airlock which may be entered and passed through with the expenditure of a minimum of time and effort.

An object of the invention is to provide an airlock having manways which may be opened or closed either from one side or from both sides, with facility and with complete security.

A corollary object of the invention is to provide a quick opening manway which is sealed tightly against fluid pressure coming at random from either side.

An object of the invention is to provide a manway operable from either side of the wall in which it is placed and which is free from bolts, screws, or other means for forcing the closure plate toward the ring.

An object of the invention is to provide a manway sealed against fluid pressure coming from either side which is provided with self-sealing gaskets only.

In explaining the invention, reference is made to the attached drawings, in which:

Fig. 6 is a detail in section of a form of gasket and seat combination slightly modified from that of Fig. 5;

Fig. 7 is a plan view of the lower side of a hinged manway having a locking device differing from that of the form of Figs. 2 and 3;

Fig. 8 is a section through the same, as on the line 8—8 of Fig. 7;

Fig. 9 is a longitudinal section through a form of airlock particularly adapted to be built into the egress chamber of a submarine vessel; and Fig. 10 is a detail of a capscrew which may be backed out from either end and which is adapted to the bolting down of the false cover shown at 43 in Fig. 9.

Figure 1:
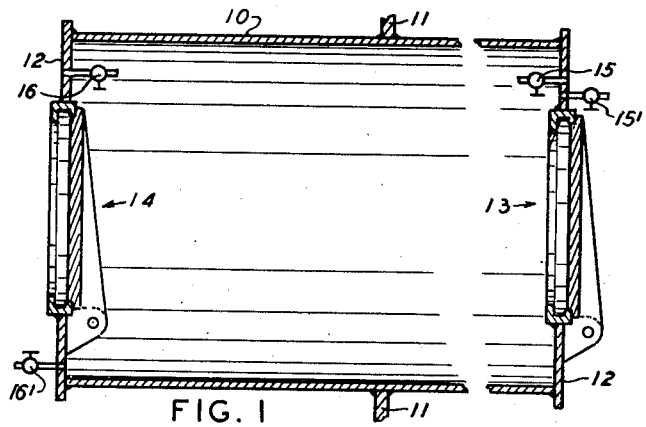
Fig. 1 is a longitudinal section through a general purpose airlock adapted to be provided with my improved manways and manway packings and which may be built into or bolted to the wall of any tank or closed vessel.

Referring first to Fig. 1, 10 is a shell of cylindrical form and of any convenient dimensions, such for example as 42 inches diameter by 84 inches length. This shell may be fixed in or temporarily bolted to the wall of the vessel to which access is to be had, and 11—11 may be taken as indicating fragments of the wall of the vessel or of a flange adapted to be bolted over a suitable opening in such wall. Each end of the shell has a tight head 12 and each head is provided with a manway as at 13 and 14 and with vent valves 15—15' and 16—16'. These valves are used for equalizing pressures and to permit the closure plate to be lifted without using force in case the excess pressure comes on the outside of the plate. The two valves 15 and 16, which are operable from within the shell, suffice for ordinary operation but it is desirable to add the valves 15' and 16' to care for emergencies.

The drawings illustrate two types of manway structure, these having the common characteristics that they are free from bolts, studs, or temper screws and may be opened and closed almost instantly, that the cover plate is hinged to the ring, and that the plate may be unlocked and opened from either side of the sheet in which the manway is set. These manways differ in that the form of Figs. 2 and 3 may be so proportioned and dimensioned that the plate may be brought to bear with a light pressure against the ring, while the form of Figs. 7 and 8 is designed to bring the plate only into contact with or close proximity to the ring. Thus the form of Figs. 2 and 3 may be used with a gasket in compression while the form of Figs. 7 and 8 is adapted for use with self-sealing gaskets only. Specifically, the first named form may be used with the packing combination of either Fig. 4, 5, or 6, while the latter form is adapted to the use of the packing combination of Figs. 5 and 6 only.

Figure 2:
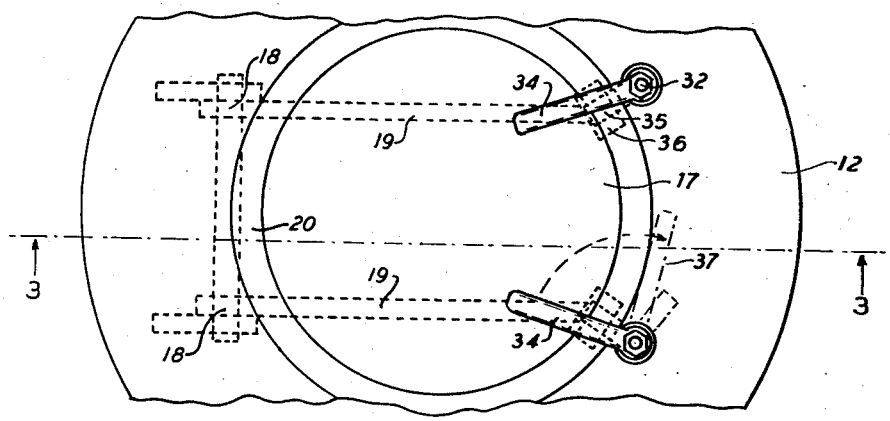
Fig. 2 is a plan view of a hinged-plate manway such as indicated at 13 and 14 in Figs. 1 and 9 and which is adapted to be opened from either side.

If it is sufficient for the purpose to have the manway subject to opening and closing from only one side, the simpler structure illustrated in Figs. 1 and 2 of my application Serial No. 265,670, filed April 3, 1939, and entitled "Manhole structure," may be used.

Figure 3:
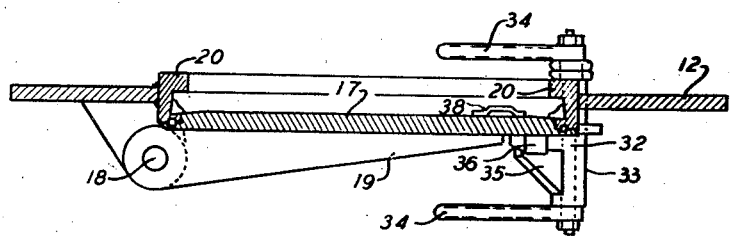
Fig. 3 is a cross section through the same, as on the line 3—3 of Fig. 2, showing certain parts in elevation.

Referring now to Figs. 2 and 3, a rind 20 is fixed as by welding into a plate 12, which may be one of the heads of the airlock, or a false plate adapted to be bolted over an opening in such head, or the wall proper of any pressure or vacuum vessel. A rigid closure plate 17 is hinged to one side of the ring and/or to the plate in which the ring is fixed, as at 18—18. Ribs 19—19 are affixed to the plate for increased stiffness. The side of the plate opposite to that carrying the ribs may be provided with a handhold 38 for lifting the plate into closed position, this being needed if the plate opens downwardly.

The plate, when swung closed by hand, is locked in position by means of a lug 35 projected from the side of a shaft 32 which passes through plate 12 and is guided and rotatably sealed in the plate by any convenient stuffing box indicated at 33. The shaft is provided at each end with a handle 34, by which it may be rotated from either side of the plate. On rotation of the shaft in one direction the lug engages the narrow end of a wedge 36, preferably of brass or other antifriction metal, affixed to the lower side of the plate, and thus urges the plate upwardly. On reverse rotation, as to the position indicated at 37 in Fig. 2, both the lug and the handle are carried clear of the opening in the ring so that the plate may be opened on its hinges.

Figure 4:
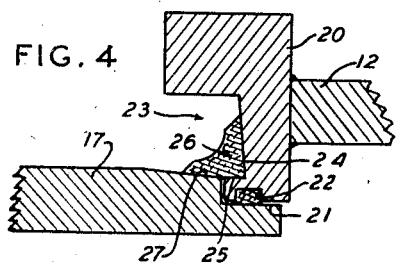
Fig. 4 is a detail in section of a gasket combination using a compression gasket with a self-sealing gasket.

With this type of lock, which is capable of exerting a gentle pressure of the peripheral portion of the plate against the end of the ring, it is possible to use the combination of pressure gasket 22 and self-sealing gasket 26 illustrated in Fig. 4. In this structure the edge of the plate is relieved as at 21 and a groove is formed in the lower face of ring 20 to receive a soft ring gasket 22 which is held in compression against face 21. The inner side of ring 20 is recessed as generally indicated at 23, the face 24 of this recess being slightly flared downwardly. A shoulder 25 retains a generally triangular gasket 26 of resilient material such as rubber or "neoprene," this gasket bearing lightly against flaring face 24 and also against a gently bevelled face 27 formed on the upper side of the plate around its edge.

The type of manway illustrated in Figs. 7 and 8 has the plate 17, the double hinge 18—18 and the ring 20 in common with the form already described, but has a different locking means. In this form the ribs 19—19 are extended beyond the periphery of the plate, each being provided at its free end with an opening adapted to receive a locking pin 39, this opening being in register with similar openings through the two lugs 40—40 when the plate is in the closed position. Each pin 39 is carried on an arm 41 keyed to a shaft 32 which is carried in a stuffing box 33 sealed into plate 12, the shaft being provided at its ends with hand levers 34—34, one on each side of the plate. On actuation of either of these levers to rotate the shaft, pin 39, which may be of arcuate form, is withdrawn from the openings, leaving the plate free to swing on hinges 18 or, when the plate is returned to the position shown in Fig. 8, the pin may be inserted by rotating the shaft in the opposite direction.

This form of manway is not adapted to the use of a compression gasket as at 22 in Fig. 4 as no means is provided for forcing the plate toward the ring, the locking pins 39 merely holding the plate in a fixed position closely adjacent the ring. This form, however, is materially stronger than that of Figs. 2 and 3 as there is no bending stress on the shaft 32 or its guide, the pin 39 being in shear between lugs 40—40 and the projected end of rib 19. I have therefore provided gasket assemblies adapted to use with this form of lock and which consist solely of self-sealing gasket elements, requiring no compression of the gasket between the elements of the manway and being tightened solely by whatever fluid pressure may be brought to bear on them.

Figure 5:
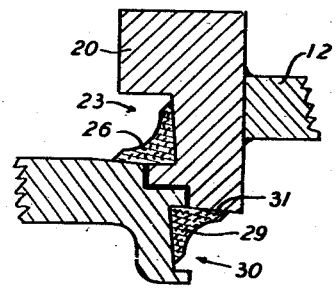
Fig. 5 is a detail in section of a gasket combination using two self-sealing gaskets.

Referring to Fig. 5, the self-sealing gasket 26 of Fig. 4 is retained but the compression gasket 22 of that figure is replaced by a second self-sealing gasket 29 seated in a recess 30 formed in the outer edge of the plate and containing a bevelled face 31 formed on the lower end of manway ring 20. When the plate is unlocked and opened, the gasket ring 26 is retained by the manway ring and the gasket ring 29 by the closure plate.

In the form shown by Fig. 6 the assembly is identical with that of Fig. 5 except that the recesses 23 and 30 are both formed in the material of the ring 20 and the gaskets 26 and 29 are retained by the ring when the plate is swung away from it. It is also possible, though not usually desirable, to form both recesses in the material of the plate.

Both of these gasket assemblies may be used with the manways of Figs. 2 and 3 and of Figs. 7 and 8, as well as with the manway structure of the copending application above identified.

It is essential to the functioning of the type of sealing means indicated at 26 and 29 in the above descriptions that the angle formed by the faces which contact the metallic surfaces of plate and ring be slightly more obtuse than the angle formed by these metallic faces. For example, the two faces of gasket 26 which contact metallic faces 24 and 27 may be arranged at an angle of 90° (when free) and the metallic faces 24 and 27 at an angle of 75° to 85°. Then when the gasket ring is crowded into recess 23, its lower outer corner is retained by shoulder 25, the upper edge of the gasket is closely contacted with face 24 by the resilience of the gasket material, and when plate 17 is positioned, the inner edge of the gasket is likewise closely contacted with face 27. These two edge contacts afford a preliminary seal and prevent fluids passing over the edge and behind the gasket, thus ensuring that fluid pressure applied to the free side of the gasket will seal it still more firmly. Thus no part of the gasket is compressed other than by fluid pressure. The locking means may be so arranged as to hold the plate in light metallic contact against the end of the ring or slightly spaced from it, providing that this spacing be insufficient to permit flowing or extrusion of the gasket material under such fluid pressure as may be contemplated.

Fig. 9 illustrates a form of airlock advantageous as a means for escape from submerged vessels and particularly adapted to the provision of either of the forms of manway above described. In this form the curved plate 42 may be taken as representing a section of the shell of a shallow turret projecting from the deck of the vessel, one or more airlock shells 10 being arranged horizontally within such turret and being in free communication with the interior of the vessel. Shell 10 is permanently attached to the turret wall, in which is formed an opening slightly smaller than the interior diameter of the shell. This opening may desirably be closed under normal conditions by a false cover 43 retained by a plurality of bolts or capscrews 44 so formed as to be capable of being backed out from inside the shell.

A screw of this type is illustrated in Fig. 10, the point of the screw being provided with a hexagonal socket 45 for use with an Allen setscrew wrench.

A manway 13 is fixed in a head 12 spaced a short distance from the false cover and a manway 14 is fixed in the side of the shell or in the inner head 12' as may be convenient. Either type of manway above described may be used in this structure, though the form of Figs. 7 and 8 is preferred as affording greater strength in case of deep submergence.

I claim as my invention:

1. In a manway for pressure or vacuum vessels: a metallic ring adapted to be fixed in the wall of said vessel; a closure plate hinged to swing toward and away from the end of said ring; means operable from each side of said wall for locking said plate in closed position; a compression gasket of resilient material interposed between the end of said ring and the mating surface of said plate, and a substantially triangular self-sealing gasket arranged in an angular recess formed by adjacent portions of said ring and said plate for sealing said plate to said ring against fluid pressure operating from one side of said wall.

2. In a manway for pressure or vacuum vessels: a metallic ring adapted to be fixed in the wall of said vessel; a closure plate hinged to swing toward and away from the end of said ring; means operable from each side of said wall for locking said plate in closed position; a pair of substantially triangular gaskets arranged substantially concentrically in angular recesses formed by adjacent portions of said ring and said plate, said gaskets having their exposed faces oppositely directed as regards said wall, each said gasket sealing said plate to said ring against fluid pressure operating only from the side of said wall toward which said free face is directed.

3. In a manway for pressure or vacuum vessels: a metallic ring adapted to be fixed in the wall of said vessel; a closure plate hinged to swing toward and away from the end of said ring; means for locking said plate in closed position; a pair of substantially triangular gaskets arranged substantially concentrically in angular recesses formed by adjacent portions of said plate and said ring, said gaskets having their exposed faces oppositely directed as regards said wall, each said gasket sealing said plate to said ring against fluid pressure operating only from the side of said wall toward which said free face is directed.

4. In a manway for pressure and vacuum vessels: a metallic ring and a closure plate swingingly supported at one side thereof; a shaft passing perpendicularly through the wall of said vessel and rotatably sealed therein; a hand lever at each end of said shaft for rotation thereof; a pair of lugs projected from said wall and a rib projected from said plate to pass between said lugs, said rib and said lugs having openings arranged to register when said plate is in closed position; an arm projected from said shaft and a pin carried by said arm and arranged to enter said openings and thereby to lock said plate in closed position on rotation of said shaft.

5. An airlock comprising: a substantially cylindrical shell having oppositely disposed heads; vent valves in said heads operable from within and without said shell; a manway in each said head and a closure plate swingingly attached to each said manway; means operable from each side of each said head for locking and unlocking said closure plates, and a substantially triangular gasket, tightened by fluid pressure only, arranged on each side of each said plate to prevent fluid leakage through said manway in either direction of excess pressure.

6. An airlock comprising: a substantially tubular closed shell adapted to be fixed in the wall of a pressure or vacuum vessel; spaced manways, each comprising a ring or a closure plate swingingly supported, positioned in said shell to afford access to the interior thereof, one of said manways being positioned to permit passage from said shell into said vessel; means operable from both within and without said shell for locking each said plate in closed position against the end of the corresponding ring; a substantially triangular gasket, subject to fluid pressure only, arranged on one side of each said plate to prevent fluid leakage through said manway in one direction, and a second gasket arranged in parallel with first said gasket to prevent fluid leakage through said manway in the opposite direction.

7. An airlock comprising: a substantially tubular closed shell adapted to be fixed in the wall of a pressure or vacuum vessel; spaced manways, each comprising a ring and a closure plate swingingly supported, positioned in said shell to afford access to the interior thereof, one of said manways being positioned to permit passage from said shell into said vessel; means operable from both within and without said shell for locking each said plate in closed position against the end of the corresponding ring; a self-sealing gasket arranged on one side of each said plate to seal said plate to said ring against fluid leakage, said self-sealing gasket being subject to fluid pressure only, and a compression gasket interposed between each said plate and the end of the corresponding ring.

8. An airlock comprising: a substantially tubular closed shell adapted to be fixed in the wall of a pressure or vacuum vessel; spaced manways, each comprising a ring and a closure plate swingingly supported, positioned in said shell to afford access to the interior thereof, one of said manways being positioned to permit passage from said shell into said vessel; means operable from both within and without said shell for locking each said plate in closed position against the end of the corresponding ring; a pair of cooperating substantially triangular gaskets substantially concentrically arranged between each said plate and the corresponding ring, said gaskets being subject to fluid pressure only, the gaskets of each pair being oppositely disposed as regards the wall of said shell and each said gasket being effective to prevent leakage of fluid due to fluid pressure operating in one direction only on the wall of said shell.

9. In a manway for pressure or vacuum vessels: a metallic ring adapted to be fixed in the wall of said vessel; a closure plate hinged to swing toward and away from the end of said ring; means operable from each side of said wall for locking said plate in closed position, and a pair of cooperating gaskets concentrically disposed between said plate and said ring, at least one of said gaskets being of substantially triangular section and adapted to be tightened only by fluid pressure applied from one side of said plate, the other of said gaskets being capable of retaining fluid pressure applied from the opposite side.

WILLIAM A. SANDBERG.